(12) United States Patent
Ito et al.

(10) Patent No.: US 10,821,854 B2
(45) Date of Patent: Nov. 3, 2020

(54) ELECTRIC WORK VEHICLE

(71) Applicant: Kubota Corporation, Osaka-shi (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 355 days.

(21) Appl. No.: 15/833,034

(22) Filed: Dec. 6, 2017

(65) Prior Publication Data

US 2018/0326860 A1    Nov. 15, 2018

(30) Foreign Application Priority Data

May 12, 2017  (JP) .................................. 2017-095337

(51) Int. Cl.
  *B60L 1/00*  (2006.01)
  *B62D 11/04*  (2006.01)
  (Continued)

(52) U.S. Cl.
  CPC ............ *B60L 58/15* (2019.02); *A01D 34/006* (2013.01); *A01D 34/66* (2013.01); *A01D 34/78* (2013.01); *A01D 69/02* (2013.01); *B60L 1/003* (2013.01); *B60L 7/003* (2013.01); *B60L 7/10* (2013.01); *B60L 7/22* (2013.01); *B60L 11/1861* (2013.01); *B60L 15/025* (2013.01); *B62D 11/04* (2013.01); *A01D 2101/00* (2013.01); *B60L 7/16* (2013.01); *B60L 2200/40* (2013.01)

(58) Field of Classification Search
  None
  See application file for complete search history.

(56) References Cited

U.S. PATENT DOCUMENTS

2012/0159916 A1* 6/2012 Ishii ....................... A01D 34/64
                                                        56/10.2 A
2013/0054070 A1* 2/2013 Nakagawa ............. A01D 69/02
                                                        701/22

(Continued)

FOREIGN PATENT DOCUMENTS

JP    2001128315 A    5/2001
JP    2013212006 A    10/2013

*Primary Examiner* — Peter D Nolan
*Assistant Examiner* — Demetra R Smith-Stewart
(74) *Attorney, Agent, or Firm* — The Webb Law Firm

(57) ABSTRACT

An electric work vehicle includes: an electric motor unit including a plurality of motors (21, 22, and 130); a motor control unit (50) that adjusts electric power from a battery (20) and supplies the adjusted electric power to the electric motor unit by controlling an inverter (4); a charge control section (53) that controls charging and discharging of the battery (20); a battery state detection device (9) that detects a state of the battery (20) including a rate of charge; and a regenerative electric power detection device (6) that detects a generation of regenerative electric power. When the rate of charge is in a margin region that is set between an overcharge region and a charge/discharge region, and when regenerative electric power is generated, the motor control unit (50) supplies the regenerative electric power to a motor that is not in operation, and provides a non-rotation current instruction to the inverter (4), the non-rotation current instruction being an instruction for generating a magnetic flux that does not cause the motor to rotate by using vector control.

8 Claims, 3 Drawing Sheets

(51) Int. Cl.
*A01D 34/00* (2006.01)
*A01D 34/66* (2006.01)
*A01D 34/78* (2006.01)
*A01D 69/02* (2006.01)
*B60L 58/15* (2019.01)
*B60L 7/10* (2006.01)
*B60L 7/00* (2006.01)
*B60L 15/02* (2006.01)
*B60L 7/22* (2006.01)
*B60L 11/18* (2006.01)
*A01D 101/00* (2006.01)
*B60L 7/16* (2006.01)

(56) References Cited

U.S. PATENT DOCUMENTS

2015/0202966 A1* 7/2015 Oyama ............... B60L 15/2009
                                                    701/22
2018/0244157 A1* 8/2018 Hirakawa ................. B60L 7/24

* cited by examiner

ELECTRIC WORK VEHICLE

CROSS REFERENCE TO RELATED APPLICATION

This application claims priority to Japanese Patent Application No. 2017-095337 filed May 12, 2017, the disclosure of which is hereby incorporated in its entirety by reference.

BACKGROUND OF THE INVENTION

1. Field of the Invention

The present invention relates to an electric work vehicle. To be more specific, the present invention relates to an electric work vehicle that includes a motor control unit that adjusts electric power from a battery by controlling an inverter and supplies the electric power to an electric motor unit, and a charge control section that controls charging and discharging of the battery.

2. Description of the Related Art

In an electric work vehicle as described above, regenerative electric power is collected as charging power of the battery. However, if the battery has a high rate of charge, due to the collection of regenerative electric power, the rate of charge of the battery may exceed an appropriate charge/discharge region to cause an overcharge, compromising the battery performance.

In order to avoid the overcharge due to regenerative electric power, JP 2001-128315 A proposes providing an over-current prevention device that is a capacitor such that the capacitor can absorb regenerative electric power if it is unnecessary to charge the battery with regenerative electric power. However, in order to prevent the battery overcharge at the time of regenerative braking, it is necessary to additionally provide a large-capacity capacitor for absorbing regenerative current, which increases the production cost.

JP 2013-212006 A discloses an electric work machine that includes: a travel electric motor that drives drive wheels; a mower electric motor that drives rotor blades; and a control unit that has a discharge mode for supplying regenerative electric power to the mower electric motor according to the charge state of the battery. In the discharge mode that avoids an overcharge, power for running the mower electric motor in one direction and power for running the mower electric motor in the other direction are alternately supplied to the mower electric motor. With this configuration, it is possible to consume regenerative electric power without causing the rotor blades to substantially rotate. However, this configuration requires the power transmission mechanism of the rotor blades to be capable of transmitting both forward rotational power and reverse rotational power, which may cause a problem in that the rotor blades move slightly.

Under the circumstances described above, there is a demand for a further improved regenerative electric power consuming technique for avoiding a battery overcharge. Therefore, an electric work vehicle as under is proposed.

SUMMARY OF THE INVENTION

An electric work vehicle comprising:
a battery;
an electric motor unit including a plurality of motors;
an inverter;
a motor control unit that adjusts electric power from the battery and supplies the adjusted electric power to the electric motor unit by controlling the inverter;
a charge control section that controls charging and discharging of the battery;
a battery state detection device that detects a state of the battery including a rate of charge; and
a regenerative electric power detection device that detects a generation of regenerative electric power,
wherein when the rate of charge is in a margin region that is set between an overcharge region and a charge/discharge region, and when the regenerative electric power is generated, the motor control unit is configured to supply the regenerative electric power to a motor that is not in operation among the plurality of motors, and provide a non-rotation current instruction to the inverter, the non-rotation current instruction being an instruction for generating a magnetic flux that does not cause the motor to rotate by using vector control.

With this configuration, if regenerative electric power is generated in a charged state in which the battery may be overcharged (in a state in which the battery charge state is in the margin region set between the overcharge region and the charge/discharge region), a non-rotation current instruction is provided to the inverter, the non-rotation current instruction being an instruction for the inverter to supply, to an electric motor that is not the regenerative electric power source and is not in operation, an electric current that generates a magnetic flux that does not cause the motor to rotate (for example, a current instruction that sets a q-axis current component of electric current supplied to the motor that is not in operation to zero). With this configuration, torque is not generated in the electric motor that is not in operation while consuming the regenerative electric power, and thus the electric motor does not perform a rotation operation. In this way, by simply controlling the inverter, the regenerative electric power can be consumed without substantially driving the electric motor. As a result, the margin region can be set small, and the charge/discharge region can be set wide, and it is therefore possible to achieve efficient use of the battery.

An electric work vehicle obtained by motorizing agricultural equipment such as a grass mower or construction equipment such as a backhoe includes a travel electric motor that drives drive wheels and a work electric motor that drives a work implement. With the electric work vehicle, at the time of work traveling in which the electric work vehicle travels while working on a grass field or farmland, the regenerative electric power generated in the travel electric motor can be consumed by the work electric motor. However, at the time of non-work traveling in which the electric work vehicle travels on a road, a worked site or the like, the work electric motor is inactivated, and thus the regenerative electric power generated in the travel electric motor cannot be consumed by rotation of the work electric motor.

For this reason, according to one preferred embodiment, when the rate of charge is in the margin region, and when regenerative electric power is generated in the travel electric motor and the work electric motor is in operation, the motor control unit supplies the regenerative electric power to the work electric motor via the inverter. The regenerative electric power may be supplied directly to the work electric motor via the inverter, or may be supplied to the work electric motor indirectly by bypassing the battery. Here, the present invention encompasses the two configurations.

On the other hand, when the rate of charge is in the margin region, and when regenerative electric power is generated in the travel electric motor and the work electric motor is not in operation, the motor control unit supplies the regenerative electric power to the work electric motor via the inverter, and provides the non-rotation current instruction to the inverter. With this configuration, the overcharge of the battery that may occur when traveling on a long downhill or the like can be avoided by simply performing inverter control.

In the case where the electric work vehicle is configured as an electric grass mowing machine, the work implement is configured as a mower unit, and the travel electric motor includes a left wheel motor that drives a left rear wheel and a right wheel motor that drives a right rear wheel, which are independently driven and controlled, and the work electric motor includes a mower motor that drives blades of the mower unit.

In an electric grass mowing machine, if a traveling brake is applied while the electric grass mowing machine is traveling in an area where a grass mowing operation is prohibited or an area where a grass mowing operation is not allowed, or if the electric grass mowing machine travels on a downhill, regenerative electric power may be generated in the left wheel motor and the right rear wheel. At this time, if the rate of charge of the battery in the electric grass mowing machine is in the margin region, in order to avoid the regenerative electric power being charged into the battery, the regenerative electric power is consumed by the mower motor. If the mower motor is in rotation operation, the mower motor uses the regenerative electric power instead of the electric power from the battery, and thus effective use of energy is achieved. On the other hand, if the mower motor is not in operation, the mower motor should be left unoperated, and thus by providing the non-rotation current instruction to the inverter when supplying the regenerative electric power to the mower motor, the regenerative electric power can be consumed by the mower motor without causing the mower motor to rotate.

Also, a motorized backhoe or the like is often used so as to perform a pivoting operation while the motorized backhoe is not in travel operation. In such an electric work machine, the regenerative electric power generated in the work electric motor during the pivoting operation while the electric work machine is stationary cannot be consumed by rotation of the travel electric motor.

For this reason, according to one preferred embodiment, when the rate of charge is in the margin region, and when regenerative electric power is generated in the work electric motor and the travel electric motor is in operation, the motor control unit provides an regenerative electric power consumption instruction to the inverter, the regenerative electric power consumption instruction being an instruction for supplying the regenerative electric power to the travel electric motor. The regenerative electric power may be supplied directly to the travel electric motor via the inverter, or may be supplied to the travel electric motor indirectly by bypassing the battery. Here, the present invention encompasses the two configurations.

On the other hand, when the rate of charge is in the margin region, and when regenerative electric power is generated in the work electric motor, and the travel electric motor is not in operation, the motor control unit supplies the regenerative electric power to the travel electric motor via the inverter, and provides the non-rotation current instruction to the inverter. With this configuration, the overcharge of the battery that may occur when the electric work vehicle performs a pivoting operation while it is stationary can be avoided by simply performing inverter control.

Other features and advantageous effects thereof will become apparent by reading the following description with reference to the accompanying drawings.

DETAILED DESCRIPTION OF PREFERRED EMBODIMENTS

[Overall Structure, Electric System and Power System of Electric Grass Mowing Machine]

Figure 1:
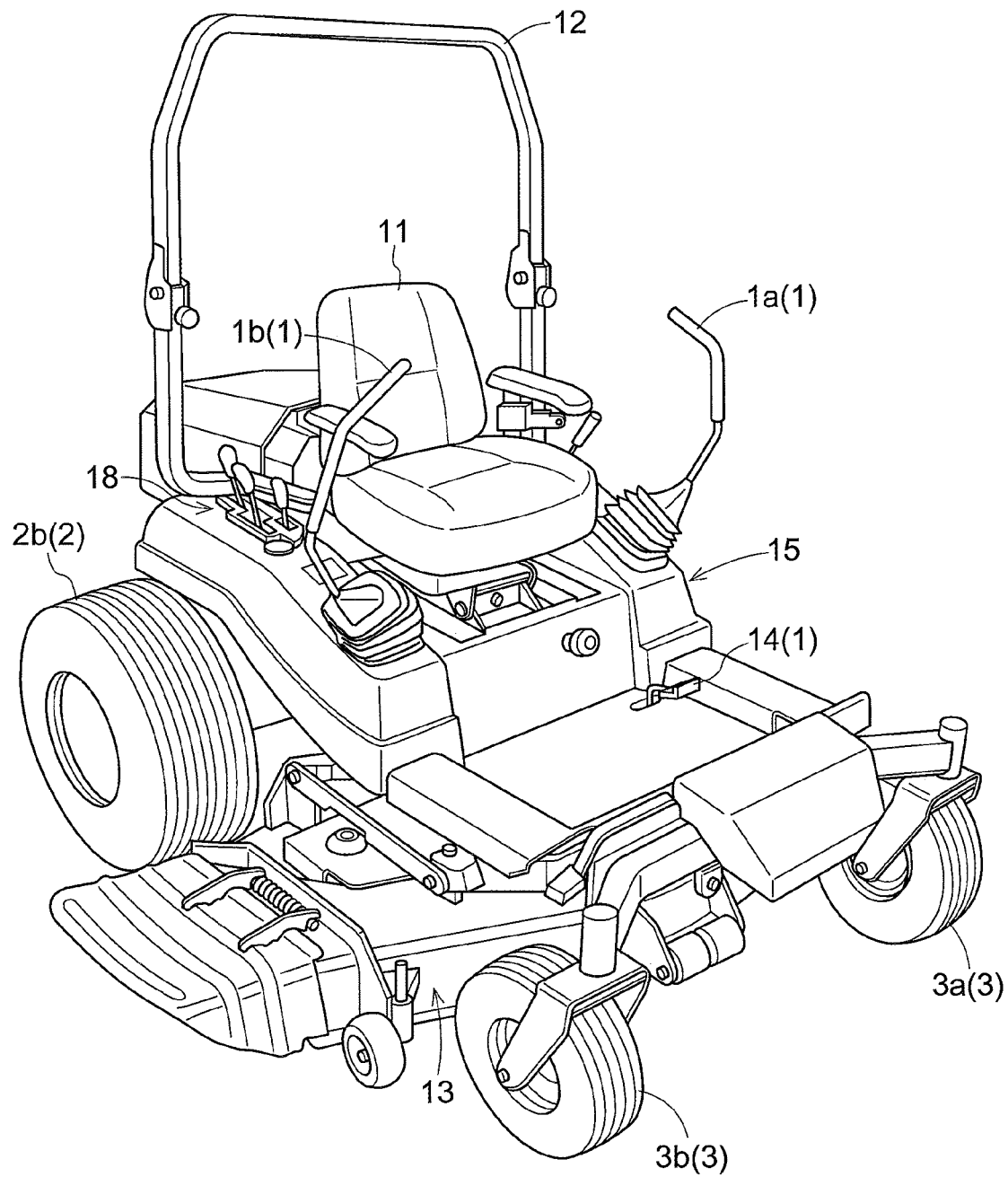
FIG. 1 is a perspective view of an electric grass mowing machine that is an example of an electric work vehicle according to an embodiment.
Figure 2:
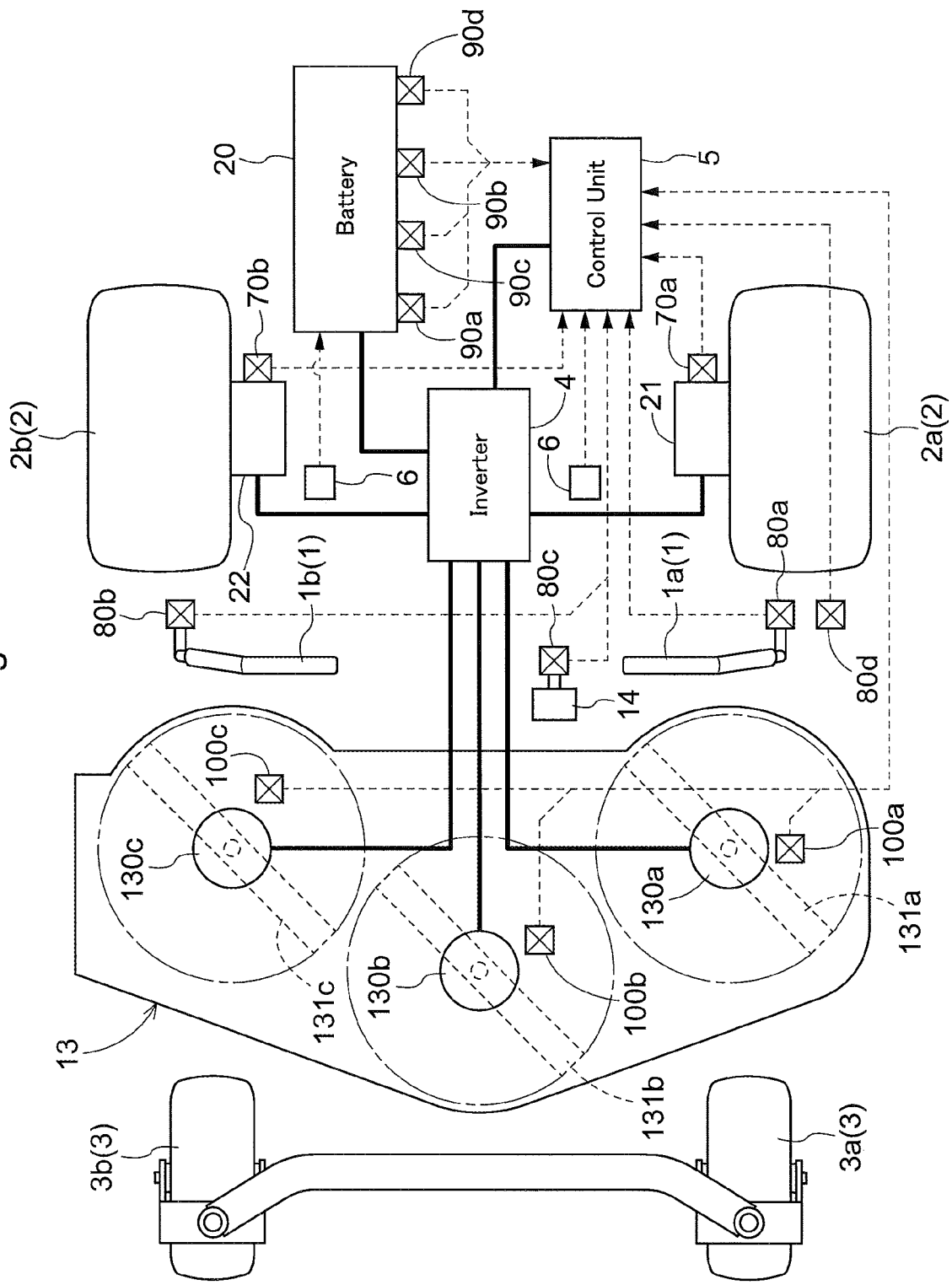
FIG. 2 is a system diagram showing an electric system and a power system of the electric grass mowing machine.

FIG. 1 is a perspective view showing an overview of an electric grass mowing machine that is an example of an electric work vehicle, and FIG. 2 is a schematic diagram showing an electric system and a power system. As can be seen from FIGS. 1 and 2, the electric grass mowing machine includes: a vehicle body 15 that is supported by a caster wheel unit 3 including front wheels and a drive wheel unit 2 including rear wheels (drive wheels); a battery 20 that is disposed in the rear portion of the vehicle body 15; a driver's seat 11 that is disposed in front of the battery 20; a rollover protection frame 12 that is provided upright on the back side of the driver's seat 11; and a mower unit 13 that is provided in a space below the vehicle body 15 and between the caster wheel unit 3 and the drive wheel unit 2, and is suspended from the vehicle body 15 so as to be capable of moving up and down via a lifting link mechanism. Power is supplied to the drive wheel unit 2 and the mower unit 13 via an inverter 4 that performs operation under control of a control unit 5 (also called ECU: electric control unit).

In front of the driver's seat 11, a floor plate is provided to function as a foot placement surface for the driver; and a brake pedal 14 protrudes upward through the floor plate. On both sides of the driver's seat 11, a left steering lever 1a and a right steering lever 1b are disposed to be pivotable about a horizontal pivot axis extending in a transverse direction of the vehicle body. Furthermore, on one side of the driver's seat 11, there is provided an operation panel 18 including a switch button or a switch lever for the electric control system. A mower switch (not shown) for activating the mower unit 13 is disposed in the vicinity of the operation panel 18. The left steering lever 1a, the right steering lever 1b, the brake pedal 14 and the mower switch are operated by the driver.

In the present embodiment, a left rear wheel 2a and a right rear wheel 2b are driven by a left wheel motor 21 and a right wheel motor 22, respectively, each to form a travel electric motor acting as a driving source. In FIG. 2, the left wheel motor 21 and the right wheel motor 22 are shown like in-wheel motors, but they are not necessarily in-wheel motors. For example, it is also possible to provide the left wheel motor 21 and the right wheel motor 22 on the central region of the vehicle body, and provide a gear or belt power transmission mechanism between the left rear wheel 2a and the left wheel motor 21 and between the right rear wheel 2b and the right wheel motor 22.

[Functional Block of Control Unit]

Figure 3:
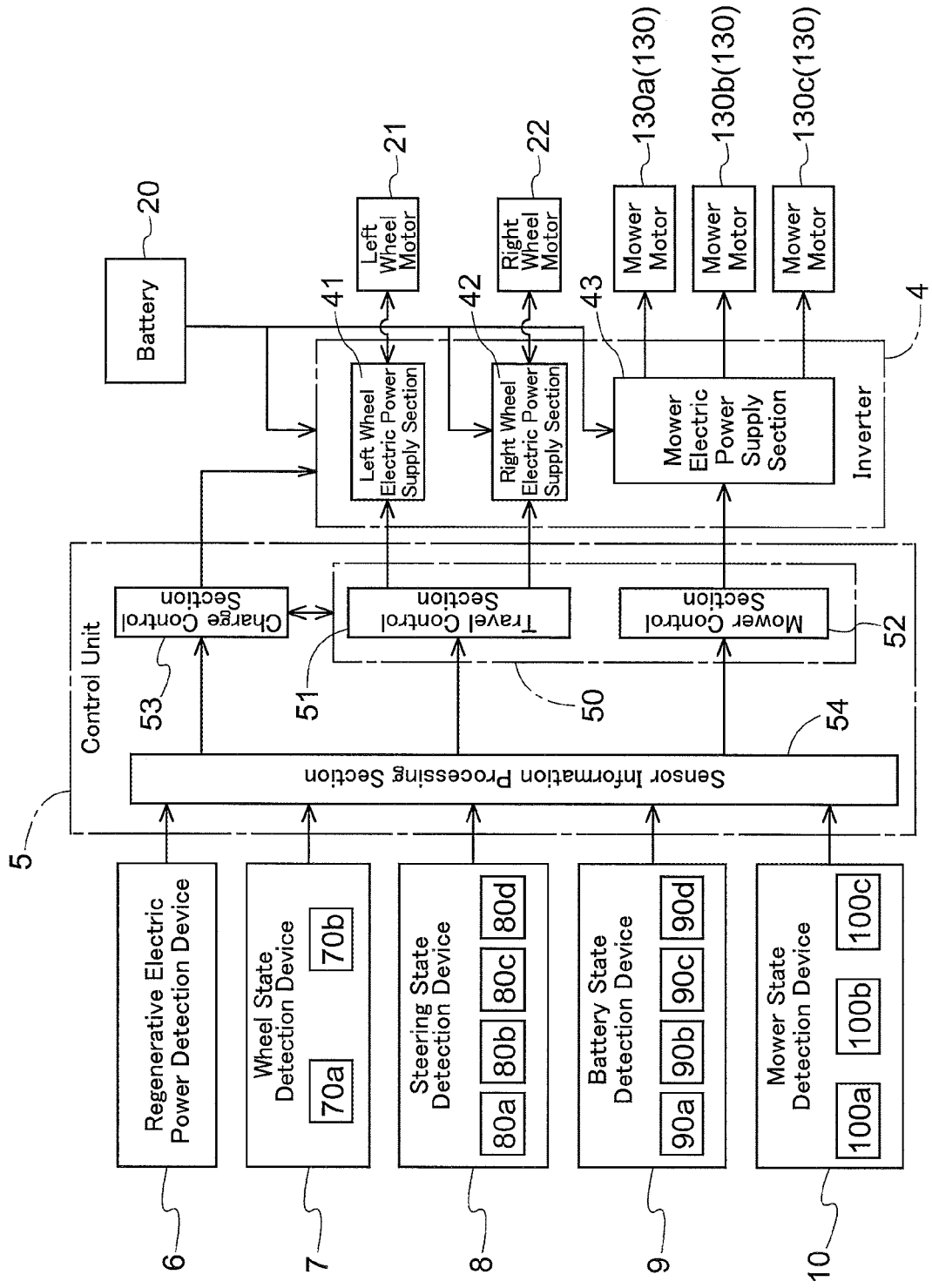
FIG. 3 is a functional block diagram of a control unit.

As shown in the functional block diagram in FIG. 3, the power from the battery 20 is independently adjusted by a left wheel electric power supply section 41 and a right wheel electric power supply section 42 that are included in the inverter 4, and then supplied to the left wheel motor 21 and the right wheel motor 22 that constitutes the travel electric motor. The rotational speed and/or the torque of the left wheel motor 21 and the right wheel motor 22 vary according to the power supplied from the left wheel electric power supply section 41 and the right wheel electric power supply section 42, respectively. The left rear wheel 2*a* and the right rear wheel 2*b* can have different rotational speeds (circumferential speeds/velocities) and thus difference in speed between the right and left rear wheels, whereby the electric grass mowing machine can change its direction of movement.

The supply power that is outputted from the left wheel electric power supply section 41 and the right wheel electric power supply section 42 is proportional to a target rotational speed (target speed) calculated by the control unit 5, but if the actual rotational speed (actual speed) falls below the target rotational speed (target speed) due to traveling loads, the supply power is changed so as to increase the motor output torque.

In the present embodiment, the mower unit 13 (an example of a work implement) includes three rotor blades 131*a*, 131*b*, 131*c*. The rotor blades 131*a*, 131*b*, 131*c* are respectively driven by mower motors 130*a*, 130*b*, 130*c* that constitute a work electric motor 130 acting as a driving source. As shown in the functional block in FIG. 3, the mower motors 130*a*, 130*b*, 130*c* are rotationally driven by the power supplied from a mower electric power supply section 43 included in the inverter 4.

In the present embodiment, the left wheel motor 21, the right wheel motor 22 and the mower motors 130*a*, 130*b*, 130*c* are provided to constitute an electric motor unit that uses the battery 20 as a power source.

As shown in FIG. 3, the control unit 5 is connected to a regenerative electric power detection device 6, a wheel state detection device 7, a steering state detection device 8, a battery state detection device 9 and a mower state detection device 10 that are input devices thereto; and the control unit 5 is also connected to the inverter 4 that is an output device therefrom.

The regenerative electric power detection device 6 is configured to detect the generation of regenerative electric power in the electric motor unit. In the present embodiment, the regenerative electric power detection device 6 includes two regenerative electric power detection devices so as to individually detect the generation of regenerative electric power in the left wheel motor 21 and the right wheel motor 22. There are various types of methods for detecting regenerative electric power, and in the instant embodiment, the regenerative electric power detection device 6 is configured to detect the generation of regenerative electric power by checking the flow of electric current flowing through the inverter 4. However, it is also possible to use the flows of current flowing through the left wheel motor 21 and the right wheel motor 22.

The wheel state detection device 7 includes sensors that detect information regarding the wheels such as a left rear wheel rotation detection sensor 70*a* that detects the rotational speed of the left rear wheel 2*a*, and a right rear wheel rotation detection sensor 70*b* that detects the rotational speed of the right rear wheel 2*b*.

The steering state detection device 8 detects the operation state of a steering unit 1. The steering state detection device 8 includes various sensors that detect information regarding steering, including a left steering angle detection sensor 80*a* that detects the pivoting angle of the left steering lever 1*a*; a right steering angle detection sensor 80*b* that detects the pivoting angle of the right steering lever 1*b*; a brake detection sensor 80*c* that detects the operating angle of the brake pedal 14; and a mower sensor 80*d* that detects the operation of the mower switch.

The battery state detection device 9 detects information regarding the charge state of the battery 20 such as the remaining capacity of the battery 20. The battery state detection device 9 includes a temperature sensor 90*a* that detects the temperature of the battery 20; a voltage sensor 90*b* that detects voltage; a current sensor 90*c* that detects electric current; and a charge rate calculation section 90*d* that calculates the rate of charge based on the electric current, voltage, temperature and the like of the battery 20.

The mower state detection device 10 detects the operation state or the like of the mower unit 13. The mower state detection device 10 includes rotation sensors 100*a*, 100*b*, 100*c* that respectively detect the rotational speeds of the mower motors 130*a*, 130*b*, 130*c*.

[Function Sections of Control Unit]

With reference to FIG. 3, as function sections for motor control and battery control in the control unit 5, there are shown a motor control unit 50 including a travel control section 51 and a mower control section 52; a charge control section 53; and a sensor information processing section 54. The travel control section 51, the mower control section 52, the charge control section 53 and the sensor information processing section 54 are substantially constructed through execution of a program, but may be at least partially constructed by hardware where necessary. The sensor information processing section 54 processes sensor signals inputted from the regenerative electric power detection device 6, the wheel state detection device 7, the steering state detection device 8, the battery state detection device 9 and the mower state detection device 10; and converts the sensor signals into information that can be used in the control unit 5.

The travel control section 51 functions to calculate the amount of control (for example, the amount of power supplied) with respect to the left wheel motor 21 and the right wheel motor 22 based on the amount of operation of the steering unit 1. The travel control section 51 determines the rotational speed (torque) of the left rear wheel 2*a*, and thus the rotational speed (torque) of the left wheel motor 21, based on the detection value of the left steering angle detection sensor 80*a* that detects the amount of operation of the left steering lever 1*a* performed by the driver. In the same manner, the travel control section 51 determines the rotational speed (torque) of the right rear wheel 2*b*, and thus the rotational speed (torque) of the right wheel motor 22, based on the detection value of the right steering angle detection sensor 80*b* that detects the amount of operation of the right steering lever 1*b* performed by the driver. Furthermore, the amount of power based on the rotational speeds (torques) is calculated. For the calculation, a table and a function that represent the relationship between the operating position and the rotational speed are used. The travel control section 51 transmits inverter control signals to the left wheel electric power supply section 41 and the right wheel electric power supply section 42 of the inverter 4 such that the amount of power determined is provided to the left wheel motor 21 and the right wheel motor 22. Furthermore, the travel control section 51 stops supply of power to the left/right wheel motors 21, 22 based on the detection of an operation of the brake pedal 14, and thereby regenerative braking by the left/right wheel motors 21, 22 is realized.

The mower control section 52 controls supply of power to the mower motors 130*a*, 130*b*, 130*c*. The mower control section 52 supplies power to the mower motors 130*a*, 130*b*, 130*c* via the mower electric power supply section 43 in response to the mower switch (not shown) being turned on by the driver; and stops the supply of power to the mower motors 130*a*, 130*b*, 130*c* in response to the mower switch being turned off.

The charge control section 53 controls charging power to the battery 20 and discharging power from the battery 20. The power discharged from the battery 20 is mainly supplied via the inverter 4 to the left/right wheel motors 21, 22 and the mower motors 130*a*, 130*b*, 130*c*. The battery 20 can be charged by using not only the power from a commercial power supply that is not shown in the diagram, but also the regenerative electric power generated through regenerative braking by the left/right wheel motors 21, 22.

[Charge Control using Regenerative Electric Power]

Next, charge control using regenerative electric power will be described. In the case where the left/right wheel motors 21, 22 are controlled as regenerative braking, for example, power generation is performed by rotation of the left/right wheel motors 21, 22, and regenerative electric power is thereby generated. The charging of the battery 20 with the use of the regenerative electric power is dependent on the drive state of the mower motors 130*a*, 130*b*, 130*c*, and the rate of charge of the battery 20.

The charge control section 53 manages the rate of charge of the battery 20 by using four separate regions: an overdischarge (undercharge) region where the rate of charge is lowest, a charge/discharge region, a regenerative electric power margin region and an overcharge region. If the battery is not charged before the rate of charge falls in the overdischarge region, an unexpected motor stoppage or the like occurs. If, on the other hand, the rate of charge reaches the overcharge region, it causes damage to the battery 20, and it is therefore necessary to avoid charging (also called overcharging) that causes the rate of charge to reach the overcharge region. In order to reliably avoid the rate of charge reaching the overcharge region, the regenerative electric power margin region is provided between the charge/discharge region and the overcharge region. When the rate of charge is in the regenerative electric power margin region, charging with the use of regenerative electric power is prohibited. In order to prohibit charging with the use of regenerative electric power, it is necessary to consume the regenerative electric power for a purpose other than the charging purpose. To this end, the motor control unit 50 is configured to supply the regenerative electric power to a motor that is not in operation among the plurality of motors, and provide a non-rotation current instruction to the inverter 4, the non-rotation current instruction being an instruction for generating a magnetic flux that does not cause the motor to rotate by using vector control.

To be specific, the motor control unit 50, including the travel control section 51 and the mower control section 52, uses vector control to perform drive control of the left/right wheel motors 21, 22 via the left/right wheel electric power supply sections 41, 42, as well as drive control of the mower motors 130*a*, 130*b*, 130*c* via the mower electric power supply section 43. Furthermore, the motor control unit 50 can generate a non-rotation current instruction for setting a q-axis current (component) to zero, and provides the generated non-rotation current instruction to the inverter 4. As a result of axis current (torque current component) flowing through the motor being set to zero, the motor torque falls to zero, and thus the motor does not rotate while consuming power. Accordingly, in order to avoid overcharge of the battery 20, it is possible to consume the regenerative electric power at a motor that is not in operation, without causing the motor to rotate.

With the electric grass mowing machine, when the rate of charge is in the regenerative electric power margin region, the generated regenerative electric power can be consumed by driving the mower motors 130*a*, 130*b*, 130*c*, rather than by charging the battery 20. Accordingly, when the rate of charge is in the regenerative electric power margin region, the regenerative electric power generated in the left/right wheel motors 21, 22 can be consumed by the mower motors 130*a*, 130*b*, 130*c*. At this time, if the mower motors 130*a*, 130*b*, 130*c* are performing rotation operation, the mower motors 130*a*, 130*b*, 130*c* are kept performing the rotation operation by using the regenerative electric power instead of the power from the battery 20. However, if the rotation of the rotor blades 131*a*, 131*b*, 131*c* is not required or if the rotation is prohibited, the mower motors 130*a*, 130*b*, 130*c* cannot perform rotation operation. For this reason, at the time when the regenerative electric power is supplied to the mower motors 130*a*, 130*b*, 130*c*, a regenerative electric power consumption instruction is outputted from the sensor information processing section 54, and a non-rotation current instruction for setting the q-axis current component of the electric current supplied to the mower motors 130*a*, 130*b*, 130*c* to zero is provided to the inverter 4. In this way, the regenerative electric power can be consumed by the mower motors 130*a*, 130*b*, 130*c*, without causing the mower motors to rotate.

In the above-described embodiment, when the rate of charge of the battery 20 is in the margin region, the regenerative electric power generated in the left/right wheel motors 21, 22 is consumed by the mower motors 130*a*, 130*b*, 130*c*. Conversely, the regenerative electric power generated in the mower motors 130*a*, 130*b*, 130*c* may be consumed by the left/right wheel motors 21, 22.

To be specific, when the rate of charge of the battery 20 is in the margin region, and if regenerative electric power is generated in the work electric motor (the mower motors 130*a*, 130*b*, 130*c*) and the travel electric motor (the left/right wheel motors 21, 22) is in operation, then the motor control unit 50 provides a regenerative electric power consumption instruction to the inverter 4, the regenerative electric power consumption instruction being an instruction for supplying the regenerative electric power to the travel electric motor (the left/right wheel motors 21, 22).

On the other hand, when the rate of charge of the battery 20 is in the margin region, and if regenerative electric power is generated in the work electric motor (the mower motors 130*a*, 130*b*, 130*c*) and the travel electric motor (the left/right wheel motors 21, 22) is not in operation, then the motor control unit 50 supplies the regenerative electric power to the travel electric motor (the left/right wheel motors 21, 22) via the inverter 4, and provides a non-rotation current instruction to the inverter 4.

In sum, in the present invention, when it is not necessary to charge the battery 20, the regenerative electric power generated in one of a plurality of electric motors (the travel electric motor or the work electric motor) is consumed by the other electric motor. However, when the rotation of the other electric motor is not necessary, the inverter 4 (the left wheel electric power supply section 41, the right wheel electric power supply section 42 and the mower electric power supply section 43) is controlled such that the q-axis current component of the electric current supplied to the other electric motor falls to zero.

Other Embodiments (1) In the foregoing embodiment, as the non-rotation current instruction, a current instruction is used that sets the q-axis current component of the electric current supplied to the mower motors 130a, 130b, 130c falls to zero. However, other than the non-rotation current instruction, it is also possible to use a current instruction that generates a magnetic flux that does not cause the motor to rotate by using vector control.

(2) As the regenerative electric power detection device 6, any type of regenerative electric power detection device can be used. For example, the regenerative electric power detection device 6 may be configured to detect the generation of regenerative electric power by checking the flow of electric current flowing through the inverter 4. Alternatively, the regenerative electric power detection device 6 may be configured to detect the generation of regenerative electric power based on brake control in response to an operation of the brake pedal 14. Also, the generation of regenerative electric power may be detected from an event that occurs while traveling on a downhill or the like, in which the rotational speed of the left/right rear wheels 2a, 2b becomes greater, compared with the operating position of the left/right steering levers 1a, 1b.

(3) The margin region that is set between the charge/discharge region and the overcharge region may have any width. The margin region is defined to clearly determine the boundary between the overcharge region and the charge/discharge region, and thus may be treated as, for example, a boundary line whose width is substantially zero. In such configuration, if the rate of charge exceeds the margin region that is in the form of a boundary line, charging of the battery 20 with the use of the regenerative electric power is not performed.

(4) In the foregoing embodiment, the electric motor unit that is subjected to inverter control within the gist of the present invention is configured to include a travel electric motor and a work electric motor, but another configuration is also possible in which regenerative electric power is consumed between a plurality of travel electric motors or between a plurality of work electric motors.

(5) In the foregoing embodiment, for the sake of convenience of description, the motor control unit 50, the travel control section 51, the mower control section 52, the charge control section 53 and the sensor information processing section 54 are provided separately. However, these function sections may be freely combined or divided within the scope of the present invention.

(6) In the foregoing embodiment, an electric grass mowing machine was used as the electric work vehicle, but the present invention is also applicable to any other electric work vehicles that perform operation while traveling such as electric agricultural equipment and electric construction equipment (backhoe and the like).

With regard to the other configurations as well, the embodiments disclosed herein are in all respects as illustrative, and embodiments of the present invention are not limited thereto. That is, appropriate changes and modifications may be made to the configurations that are not recited in the claims in the present application without departing from the objects of the present invention.

What is claimed is:

1. An electric work vehicle comprising:
   a battery;
   an electric motor unit including a plurality of motors;
   an inverter;
   a motor control unit that adjusts electric power from the battery and supplies the adjusted electric power to the electric motor unit by controlling the inverter;
   a charge control section that controls charging and discharging of the battery;
   a battery state detection device that detects a state of the battery including a rate of charge; and
   a regenerative electric power detection device that detects a generation of regenerative electric power,
   wherein the charge control section manages the rate of charge of the battery by separating the rate of charge into an undercharge region where the rate of charge is lowest, a charge/discharge region, an overcharge region, and a regenerative electric power margin region that is set between the charge/discharge region and the overcharge region; and
   wherein when the rate of charge is in the regenerative electric power margin region, and when the regenerative electric power is generated, the motor control unit is configured to supply the regenerative electric power to a motor that is not in operation among the plurality of motors, and provide a non-rotation current instruction to the inverter, the non-rotation current instruction being an instruction for generating a magnetic flux that does not cause the motor to rotate by using vector control.

2. The electric work vehicle according to claim 1, wherein the electric motor unit includes a travel electric motor that drives drive wheels, and a work electric motor that drives a work implement that is attached to the electric work vehicle,
   when the rate of charge is in the regenerative electric power margin region, and when regenerative electric power is generated in the travel electric motor and the work electric motor is in operation, the motor control unit is configured to supply the regenerative electric power to the work electric motor via the inverter, and
   when the rate of charge is in the regenerative electric power margin region, and when regenerative electric power is generated in the travel electric motor and the work electric motor is not in operation, the motor control unit is configured to supply the regenerative electric power to the work electric motor via the inverter, and provide the non-rotation current instruction to the inverter.

3. The electric work vehicle according to claim 2, wherein the work implement is a mower unit,
   the travel electric motor includes a left wheel motor that drives a left rear wheel and a right wheel motor that drives a right rear wheel, which are independently driven and controlled of each other, and
   the work electric motor includes mower motors that drive blades of the mower unit.

4. The electric work vehicle according to claim 1, wherein the electric motor unit includes a travel electric motor that drives drive wheels, and a work electric motor that drives a work implement,
   when the rate of charge is in the regenerative electric power margin region, and when regenerative electric power is generated in the work electric motor and the travel electric motor is in operation, the motor control unit is configured to provide a regenerative electric power consumption instruction to the inverter, the regenerative electric power consumption instruction being an instruction for supplying the regenerative electric power to the travel electric motor, and when the rate of charge is in the regenerative electric power margin region, and when regenerative electric power is generated in the work electric motor and the travel electric motor is not in operation, the motor control unit is configured to supply the regenerative electric power to the travel electric motor via the inverter, and provides the non-rotation current instruction to the inverter.

5. The electric work vehicle according to claim 2, wherein the electric motor unit includes a travel electric motor that drives drive wheels, and a work electric motor that drives a work implement, when the rate of charge is in the regenerative electric power margin region, and when regenerative electric power is generated in the work electric motor and the travel electric motor is in operation, the motor control unit is configured to provide a regenerative electric power consumption instruction to the inverter, the regenerative electric power consumption instruction being an instruction for supplying the regenerative electric power to the travel electric motor, and when the rate of charge is in the regenerative electric power margin region, and when regenerative electric power is generated in the work electric motor and the travel electric motor is not in operation, the motor control unit is configured to supply the regenerative electric power to the travel electric motor via the inverter, and provides the non-rotation current instruction to the inverter.

6. The electric work vehicle according to claim 2, wherein the non-rotation current instruction is a current instruction for setting a q-axis current that flows through the travel electric motor to zero.

7. The electric work vehicle according to claim 3, wherein the non-rotation current instruction is a current instruction for setting a q-axis current that flows through the travel electric motor to zero.

8. The electric work vehicle according to claim 4, wherein the non-rotation current instruction is a current instruction for setting a q-axis current that flows through the travel electric motor to zero.

* * * * *